United States Patent [19]
Harder, Jr.

[11] 3,951,452
[45] Apr. 20, 1976

[54] BREAKAWAY ARMREST FOR SEAT
[75] Inventor: Arthur J. Harder, Jr., Franklin Park, Ill.
[73] Assignee: Coach & Car Equipment Corporation, Elk Grove Village, Ill.
[22] Filed: Aug. 4, 1975
[21] Appl. No.: 601,581

[52] U.S. Cl. .............................................. 297/417
[51] Int. Cl.² ............................................. A47C 7/54
[58] Field of Search ........................... 297/115–117, 162, 390, 411, 417

[56] References Cited
UNITED STATES PATENTS

| | | | |
|---|---|---|---|
| 3,544,163 | 12/1970 | Krein | 297/417 |
| 3,550,958 | 12/1970 | Krein | 297/417 |
| 3,612,606 | 10/1971 | Swenson | 297/417 |

Primary Examiner—James C. Mitchell
Attorney, Agent, or Firm—Merriam, Marshall, Shapiro & Klose

[57] ABSTRACT

An armrest is connected to a seat by a two-way hinge that provides both upward rotation of the armrest and hinge in a vertical plane and lateral rotation of the armrest away from the seat. A lock connects the armrest and hinge and maintains the armrest alongside the seat until a predetermined lateral force is applied, as by a seat occupant, to rotate the armrest away from the seat and permit an occupant to move freely sideways from the seat. After rotating laterally to a position past the hinge, the hinge and armrest swing downwardly by the armrest weight, to a stored position alongside the seat back.

11 Claims, 9 Drawing Figures

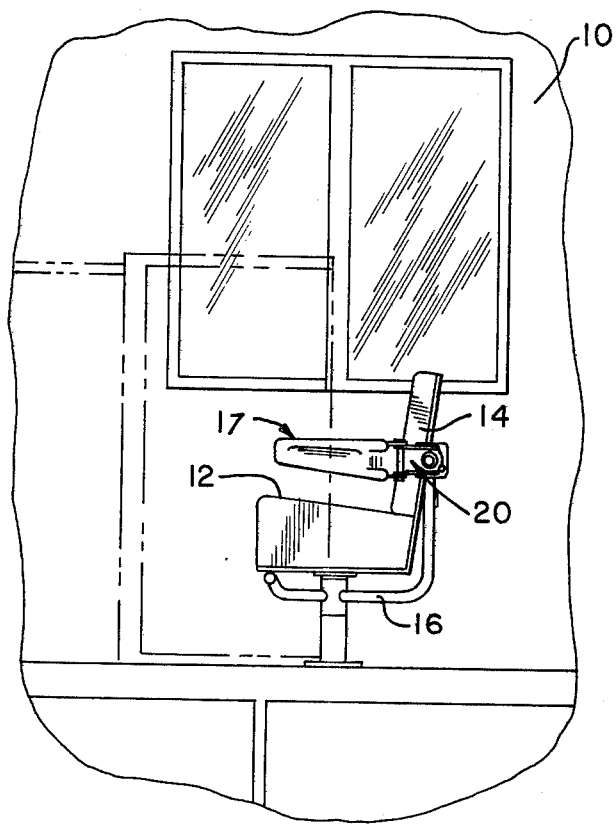
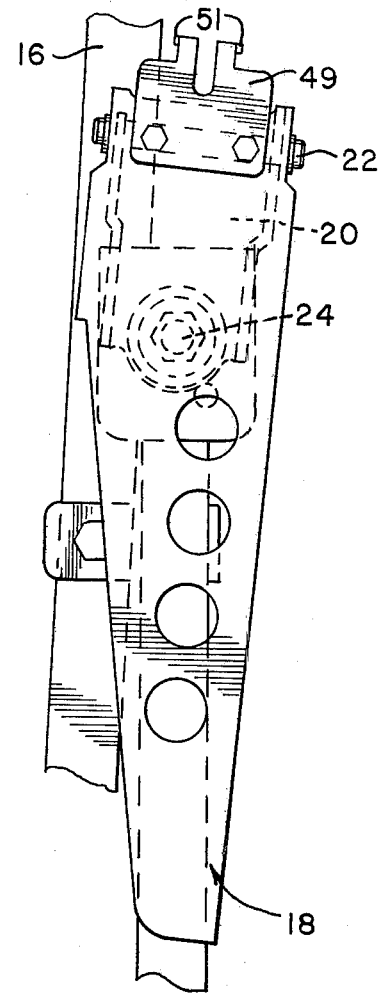
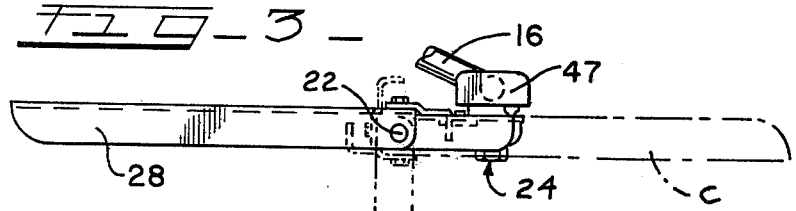
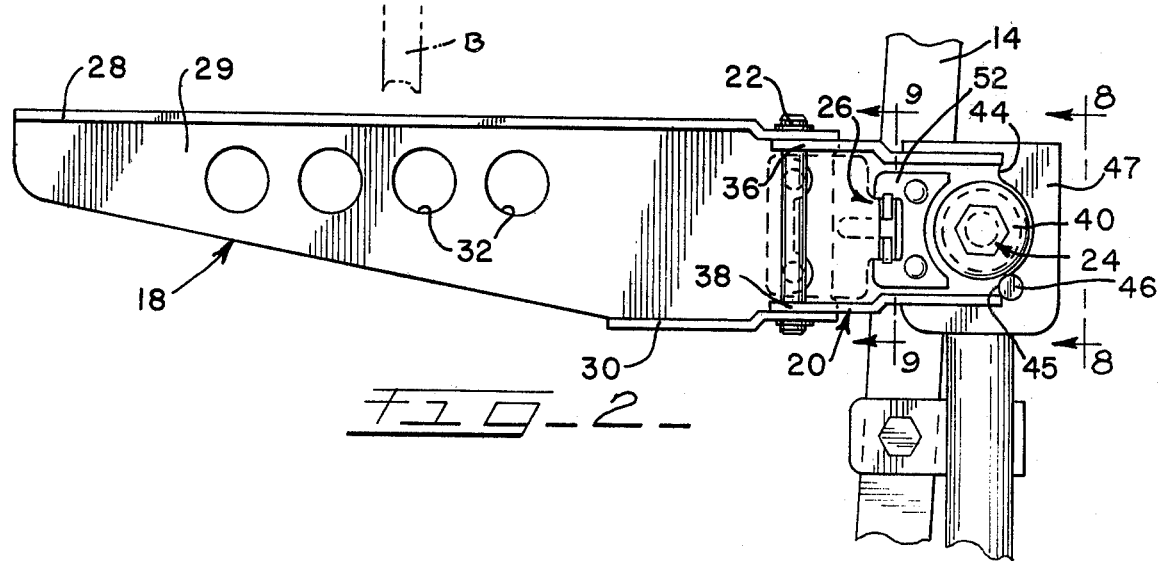

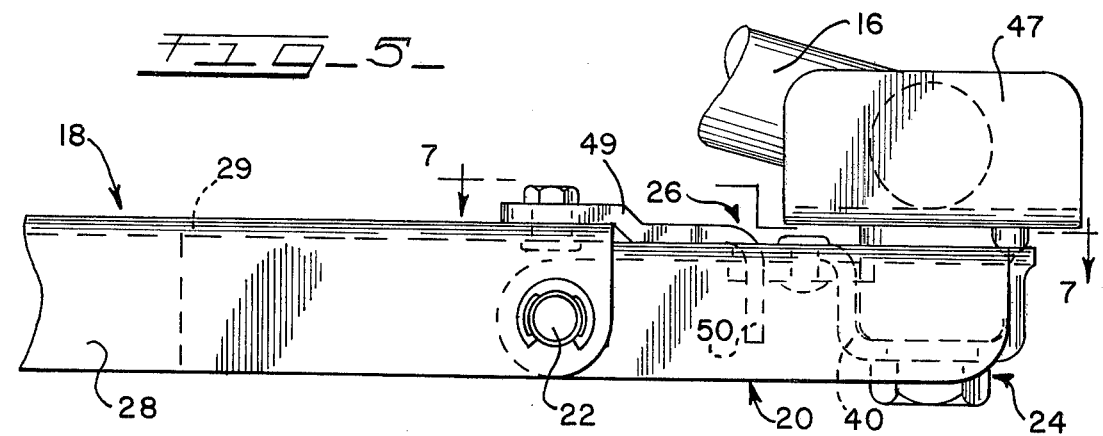
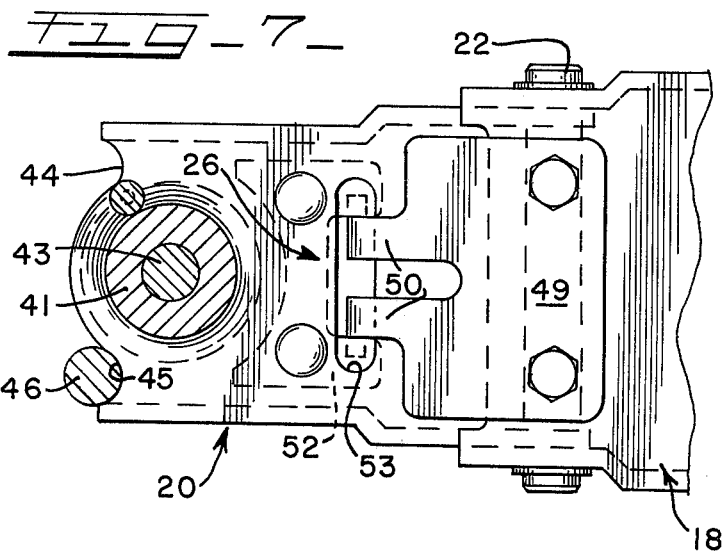
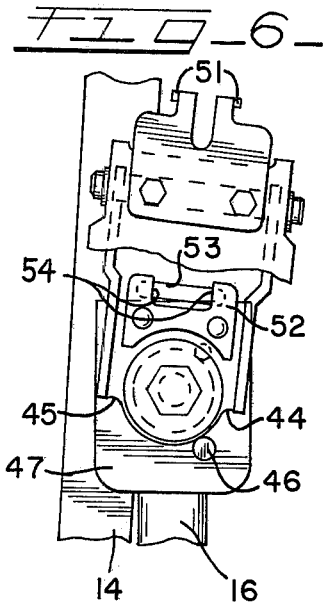
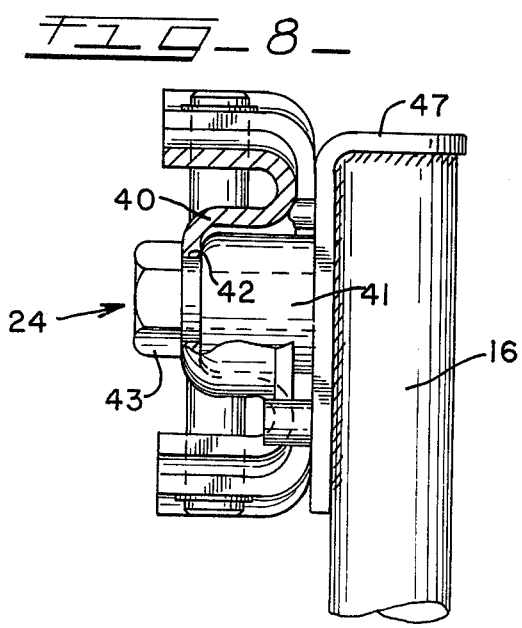
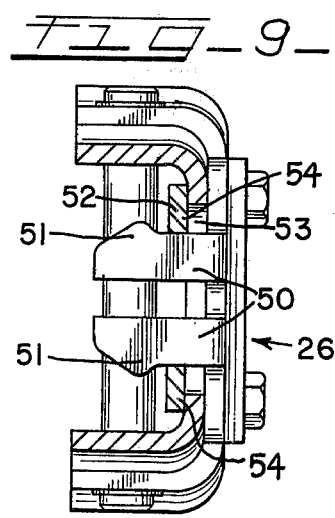

BREAKAWAY ARMREST FOR SEAT

BACKGROUND OF THE INVENTION

1. Field of the Invention

This invention pertains generally to seats with armrests and more particularly to a seat with an armrest that moves into an out-of-the-way position to permit an occupant to move laterally from a seat.

2. Description of the Prior Art

Prior art armrests used in confined areas, such as locomotives, transit or motor vehicles and the like have occasionally provided an operator armrest that pivots upwardly to a vertical or out-of-the-way position to permit the operator to leave the seat in a lateral direction. While such designs have solved a portion of the operator comfort problem in at least providing some type of armrest, they have not been fully accepted. In the event of emergency, the operator cannot move laterally from the seat without an initial delay required to pivot the armrest upwardly.

SUMMARY

The present invention provides a breakaway armrest for providing the necessary operator comfort and yet allowing an operator to move quickly and easily from the seat.

A two-way mounting hinge attaches the armrest to the seat. The mounting hinge has a first pivot means for lateral rotation of the armrest away from the seat, and the hinge is also pivotally attached to the seat for rotation upwardly away from the seat bottom in a vertical plane. A self-releasing, spring lock connects the armrest and hinge to maintain the armrest in an arm-supporting position alongside the seat. The lock permits the armrest to break away easily upon application of a predetermined, lateral, horizontal force.

In operation, when a seat occupant desires to leave the seat quickly, as in an emergency, he pushes against the armrest, applying thereto a lateral outward force which overcomes the locking force of the spring. This rotates the armrest away from the seat with a semicircular movement. After rotating to a position aligned with the back of the seat, the armrest will swing downwardly under its own weight into a compact disposition, generally parallel with and alongside the back of the seat. Thus, a simple lateral blow against the armrest will quickly moving the armrest into an out-of-the-way position, and permit the seat occupant to immediately move easily and without obstruction laterally from the seat.

These and other objects and features of the invention will become apparent from reference to the following description, drawings and claims.

BRIEF DESCRIPTION OF THE DRAWINGS

FIG. 1 is a side elevational view of a vehicle operator's compartment with a seat having a breakaway armrest constructed in accordance with the present invention;

FIG. 2 is an enlarged side elevational view of the armrest in an arm-supporting position with portions of the armrest removed for purposes of clarity;

FIG. 3 is a plan view of the armrest with various positions shown in phantom;

FIG. 4 is a side elevational view of the armrest in a stored position;

FIG. 5 is an enlarged, fragmentary plan view of the armrest and hinge;

FIG. 6 is a fragmentary side view of the hinge and armrest when the armrest is in a stored position, with portions removed;

FIG. 7 is a sectional view taken along lines 7—7 of FIG. 5;

FIG. 8 is a sectional view taken along lines 8—8 of FIG. 2, with portions removed; and, FIG. 9 is a sectional view taken along lines 9—9 of FIG. 2.

DETAILED DESCRIPTION

Referring now to the drawings, and in particular to FIG. 1, there is illustrated a cab compartment 10 such as that used in a railway engine, transit vehicle, car, truck or the like. Inside the cab is a seat comprising a seat bottom 12 and back 14, both supported on a rigid frame 16 securely attached to the floor or underframe of the vehicle.

An arm cushion 17 is fitted over an armrest 18 (FIG. 3) attached to frame 16 by hinge means 20. Arm cushion 17 may include a unitary molded foam covering or other suitable cushion for the convenience of the seat occupant, as shown in FIG. 1. Armrest 18 comprises a gusset 29 which may include a number of openings 32 (FIG. 2) to facilitate attachment of molded foam arm cushion 17 or other type of cushion member.

Hinge 20 provides a first pivot for rotation of armrest 18 about pin 22. Hinge 20 also includes a second pivot arrangement 24 that permits the hinge to rotate in a vertical plane from a generally horizontal, arm-supporting position illustrated in FIG. 2 upwardly to a generally vertical position such as is illustrated in FIG. 6.

Hinge 20 includes top and bottom flanges 36, 38 respectively, that rigidify the hinge and are used to attach the hinge 20 to the flanges 28, 30 of armrest 18 by pivot pin 22. Hinge 20 is a formed rigid metal unit that includes pressed bearing hub 40 as shown in cross-section in FIG. 8. Bearing hub 40 fits over hinge pivot stud 41. Pivot stud 41 has a raised shoulder or boss 42 about which the hinge bearing hub 40 rotates. A suitable fastener 43 is received by a threaded central portion of the pivot stud 41 and abuts the raised shoulder 42 of bearing 40, allowing enough clearance for rotation of the bearing hub 40.

As noted in FIG. 2, hinge 20 has an upper shoulder 44 and a lower shoulder 45 mounted to abut with a stop pin 46 that is attached to a frame mounting bracket 47. Lower shoulder 45 cooperates with pin 46 to hold armrest 18 in a generally horizontal position. Upper shoulder 44 limits clockwise rotation of hinge 20.

Armrest 18 can rotate 180° outwardly away from an arm supporting position alongside a seat occupant (FIG. 1) past hinge pivot pin 24, to position C, as shown in dotted lines in FIG. 3. In moving from intermediate position B to position C of FIG. 3, the armrest 18 passes hinge pivot 24; a rotating force and moment is created by gravity that pivots the hinge member 20 in a clockwise position from the essentially horizontal position illustrated in FIG. 2 to the generally vertical position illustrated in FIG. 4. This rotation of hinge 20 occurs automatically under the influence of the armrest weight.

To maintain the armrest in a horizontal, operator supporting position alongside the seat occupant, a selfbiasing lock is provided such as that shown in FIGS.

2–9. As shown in FIG. 7, the lock includes a retainer 49 mounted upon the end section of the armrest 18. Retainer 49 includes a bifurcated pair of resilient locking fingers 50 spaced by suitable radius cutout to provide a stress relief feature to insure long life and reliable operation of the locking device. End finger 50 includes a raised detent 51 that extends above the top surface of each finger a small distance to intersect and engage with portions 54 of an associated strike plate 52 illustrated in FIG. 9. Strike plate 52 is attached about slotted opening 53 in the hinge 20 (FIG. 7). Retainer 49 or the strike plate 52 may be adjustably attached to the respective mounting member so the lock members may be aligned after assembly of the armrest 18 to hinge 20.

When the armrest is in position to support an operator's arm, the locking members will be arranged in the position illustrated in FIGS. 2, 5, 7 and 9. With reference to FIG. 9, it is noticed that in a locked position the detents 51 of fingers 50 have passed under the strike plate portions 54. To release the armrest from this position a lateral horizontal force is applied to the armrest 18 to rotate armrest 18 about pivot 22 in a counterclockwise position as viewed in FIGS. 3, 5. As the armrest 18 rotates initially laterally, the fingers 50 move through slot 53, causing the detent portions 51 to engage the strike plate portions 54. As this engagement occurs, the fingers will be deflected, resulting in a locking force being applied between fingers 50 and strike plate portions 54 and to maintain the armrest 18 in position. Once the crest portion of the detent 51 has passed under the strike plate portions 54, the armrest 18 will swing freely and rapidly outwardly of the seat.

The amount of force necessary to overcome the locking force of fingers 50 is a matter of design choice and can be easily calculated from the engineering data available on the materials used and the amount of deflection of the fingers 50. The locking arrangement should be designed to maintain the armrest 18 in a supporting position when slight transit or operator forces are applied and yet allow the armrest to be released by an occupant force that would not interfere with the occupant moving rapidly from the seat.

The foregoing description and drawings merely explain and illustrate the invention and the invention is not limited thereto, except insofar as the appended claims are so limited, as those who are skilled in the art who have the disclosure before them will be able to make modifications and variations therein without departing from the scope of the invention.

What is claimed is:

1. In a seat having a rigid frame, a back and a bottom for supporting an occupant, a breakaway arm support unit comprising:
    an armrest;
    hinge means attaching the armrest to the seat frame;
    said hinge means including a first pivot means mounting the armrest for rotational movement between an arm-supporting first position extending forwardly in relation to said seat back and a second position angularly, outwardly displaced from said first position; and,
    a lock comprising releasable means normally exerting a locking action to hold the armrest against movement away from said first position, and said releasable means including means, responsive to a predetermined outward lateral force against said armrest, for releasing said locking action to permit movement of the armrest from said first position toward said second position.

2. In a seat as recited in claim 1, wherein said releasable means comprises:
    resilient retaining fingers; and,
    means for biasing said retaining fingers and for holding said fingers in locking engagement to exert said locking action.

3. In a seat as recited in claim 2, wherein said last recited means includes:
    means defining an opening disposed to allow passage of said fingers therethrough; and,
    a striker member, positioned adjacent said opening, and having means for engaging said retaining fingers to provide said locking action.

4. In a seat as recited in claim 1, wherein said arm support unit comprises:
    means on said first pivot means defining a first pivotal axis;
    means mounting said first pivotal axis for movement between an upwardly extending first disposition and a second disposition extending transverse to said first disposition; and,
    means normally maintaining said first pivotal axis in its first disposition.

5. In a seat as recited in claim 4, wherein said arm support unit comprises:
    means responsive to the movement of said armrest from its first to its second position for moving said first pivotal axis from its first to its second disposition; and,
    means, responsive to the movement of said first pivotal axis from its first to its second dispositon, for changing the position of said armrest from its second position to a third position in which said armrest is stored alongside said seat.

6. In a seat as recited in claim 5, wherein:
    said third position provides said armrest with a downward angular displacement of 90° from said first position thereof.

7. In a seat as recited in claim 1 and comprising:
    second pivot means mounting said hinge means for rotational movement, relative to said frame, about a horizontal axis, between one position, in which the hinge means is horizontally disposed and another position in which the hinge means is angularly displaced from its one position.

8. In a seat as recited in claim 7, wherein:
    said seat comprises gravity means, including the weight of said armrest, for urging the hinge means to remain in its one position when the armrest is in its first position, and for urging the hinge means to rotate toward its other position when the armrest is in its second position;
    said first pivot means comprises means mounting said armrest for movement from said second position to a third position thereof in which the armrest is stored alongside the seat; and,
    said gravity means comprising means for urging said armrest from its second toward its third position in response to rotation of said hinge means from its one to its other position.

9. In a seat having an occupant-supporting bottom, a back and a rigid frame, a breakaway arm support unit allowing the occupant to move laterally from the seat, said unit comprising:
    an armrest normally positioned in a supportive first position alongside the seat occupant;

hinge means having first pivot means mounting the armrest for movement between the first support position, in which the armrest and said hinge means are in a predetermined relation, and a second position, displaced laterally from said first position, and in which said predetermined relation is disrupted;

stop means engageable with the hinge means to maintain the armrest in its first position;

second pivot means mounting said hinge means for rotation in an upwardly extending plane away from engagement with the stop means;

locking means for maintaining the armrest and the hinge means in said predetermined relation;

said locking means including release means operable to disrupt said predetermined relation upon application of a predetermined force to the armrest;

gravity means, responsive to movement of the armrest to its second position, for rotating the hinge means away from said stop means; and, means, responsive to movement of the hinge means away from said stop means, for swinging the armrest into an out-of-the-way position alongside the seat back.

10. The arm support unit of claim 9 wherein said locking means comprise:

a strike member; and, finger means having raised detent means for engagement with said strike member to deflect the finger means and provide a locking force to hold the armrest in said first support position.

11. The arm support unit of claim 10, and comprising:

mounting means for removably attaching said finger means;

said finger means including bifurcated fingers extending transversely from said mounting means; and, said strike member including spaced contact surfaces aligned to engage the raised detent means of the finger means and produce said locking force.

* * * * *